(12) United States Patent
Taguchi et al.

(10) Patent No.: US 11,143,238 B2
(45) Date of Patent: Oct. 12, 2021

(54) BEARING STRUCTURE

(71) Applicant: Panasonic Intellectual Property Management Co., Ltd., Osaka (JP)

(72) Inventors: Hidetoshi Taguchi, Osaka (JP); Masaya Honma, Hyogo (JP); Osao Kido, Kyoto (JP); Yoshitsugu Nishiyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 560 days.

(21) Appl. No.: 16/044,428

(22) Filed: Jul. 24, 2018

(65) Prior Publication Data

US 2019/0032711 A1    Jan. 31, 2019

(30) Foreign Application Priority Data

Jul. 28, 2017    (JP) .............................. JP2017-146743

(51) Int. Cl.
*F16C 32/04* (2006.01)
*F16C 17/04* (2006.01)

(52) U.S. Cl.
CPC ............ *F16C 32/048* (2013.01); *F16C 17/04* (2013.01); *F16C 32/0402* (2013.01); *F16C 32/047* (2013.01); *F16C 32/0476* (2013.01); *F16C 2300/22* (2013.01); *F16C 2360/00* (2013.01)

(58) Field of Classification Search
CPC ... H02K 7/00; H02K 7/08; H02K 7/09; F16C 32/00; F16C 32/04; F16C 32/0404; F16C 32/044; F16C 32/0442; F16C 32/0444; F16C 32/045; F16C 32/0455; F16C 32/0459; F16C 32/046; F16C 32/0465; F16C 32/047; F16C 32/0476; F16C 32/048; F16C 32/0489; F16C 17/04; F16C 35/00
See application file for complete search history.

(56) References Cited

U.S. PATENT DOCUMENTS

| | | | | |
|---|---|---|---|---|
| 5,250,865 A | * | 10/1993 | Meeks | ................ F16C 32/0476 310/90.5 |
| 2009/0265038 A1 | * | 10/2009 | Ramsey | .............. F16C 32/0442 700/279 |
| 2013/0328455 A1 | | 12/2013 | Wu | |
| 2014/0169707 A1 | * | 6/2014 | Yoshino | .................. F16C 17/10 384/105 |

FOREIGN PATENT DOCUMENTS

| | | |
|---|---|---|
| CN | 102017369 A | 4/2011 |
| CN | 103717926 A | 4/2014 |
| JP | 9-042289 A | 2/1997 |
| JP | 2005-003009 | 1/2005 |
| JP | 2013-044394 A | 3/2013 |

OTHER PUBLICATIONS

English Translation of Chinese Search Report dated Mar. 30, 2021 for the related Chinese Patent Application No. 201810816295.8.

* cited by examiner

*Primary Examiner* — Tran N Nguyen
(74) *Attorney, Agent, or Firm* — McDermott Will & Emery LLP

(57)    ABSTRACT

A first thrust bearing includes a first electromagnet and a first member. A second thrust bearing includes a second electromagnet and a second member. A magnetic force generated by the first electromagnet and the second electromagnet, and dynamic gas pressure generated by the first member and the second member due to rotation of a rotating shaft support an axial load of the rotating shaft.

10 Claims, 10 Drawing Sheets

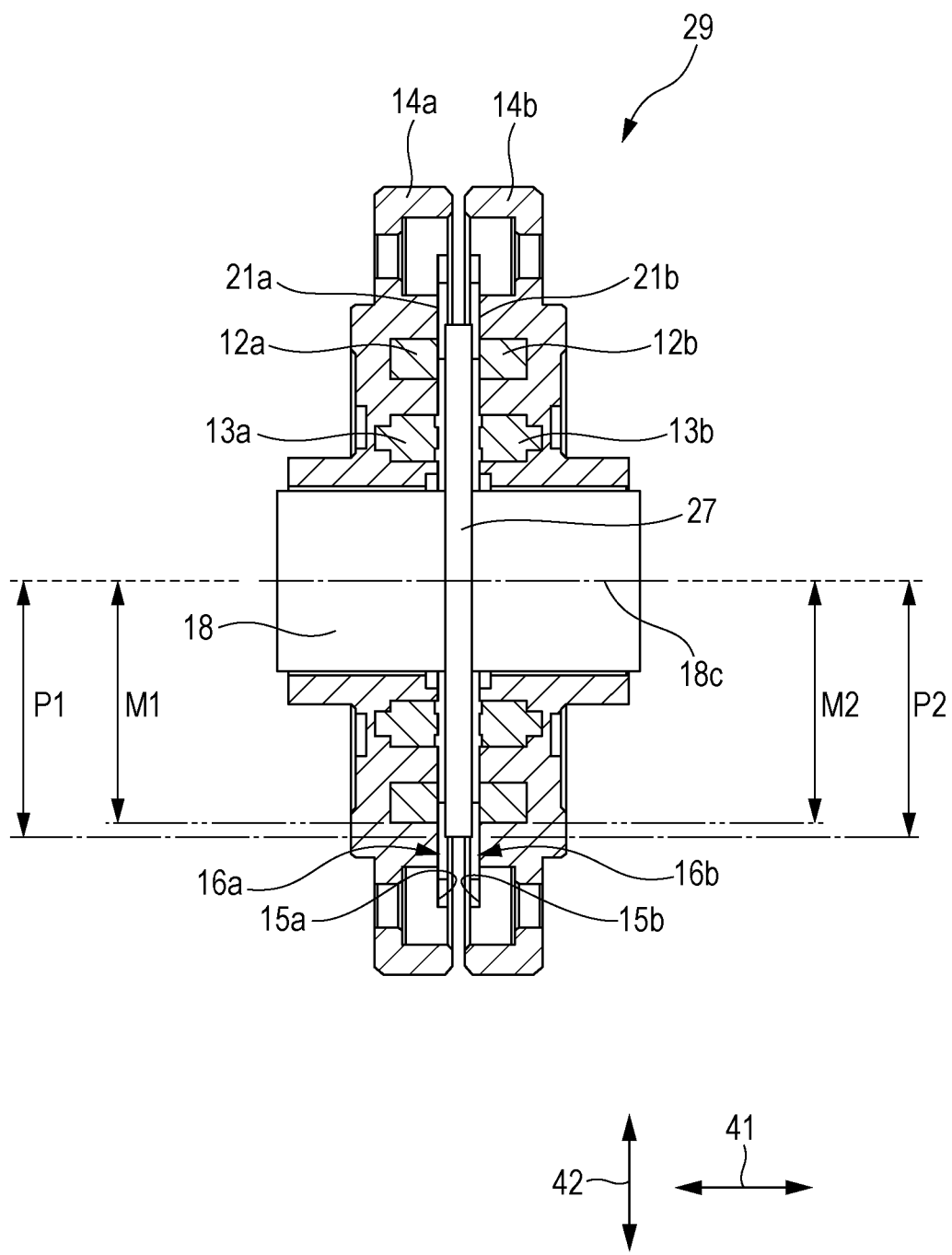

BEARING STRUCTURE

BACKGROUND

1. Technical Field

The present disclosure relates to a bearing structure.

2. Description of the Related Art

There are cases where a fluid machine has a rotating shaft and a compressor impeller attached to the rotating shaft. In this kind of fluid machine, the compressor impeller compresses a working fluid. There are cases where a fluid machine has a rotating shaft and a turbine wheel attached to the rotating shaft. In this kind of fluid machine, the turbine wheel extracts work from a working fluid. There are also cases where a fluid machine has a rotating shaft, a compressor impeller attached to the rotating shaft, and a turbine wheel attached to the rotating shaft.

Pressure is applied by the working fluid to components such as the compressor impeller and the turbine wheel. An axial load on the rotating shaft of the fluid machine is generated by this pressure. In order to support the axial load, there are cases where a fluid machine having components such as the aforementioned has a thrust collar and thrust bearings. The thrust collar is attached to part or all of the rotating shaft in the radial direction at an arbitrary position on the rotating shaft. Typically, a thrust collar has a disk shape in which the axial length is shorter than that of the rotating shaft, and is configured so as to be coaxial with the rotating shaft. Thrust bearings are disposed in such a way as to oppose the thrust collar.

Sliding bearings, rolling bearings, and magnetic bearings are examples of bearings that are applied for the thrust bearings. Sliding bearings can support an axial load using lubricating oil, air, or the like. Rolling bearings can support an axial load using rollers or balls as rolling bodies. Magnetic bearings can support an axial load using the magnetic force of an electromagnet. In a case where magnetic bearings are used, a thrust collar made of a magnetic material can be used.

An example of a bearing structure that uses magnetic bearings is described in Japanese Unexamined Patent Application Publication No. 2005-3009. As depicted in FIG. 4, this bearing structure is provided with a pair of thrust bearings 86, a rotating shaft 53c, and a thrust collar 84. Each of the pair of thrust bearings 86 has an electromagnet 85a and a protective member 91 that is made of a synthetic resin and protects a surface of the electromagnet 85a.

Incidentally, magnetic bearings sometimes lose the function thereof due to a power supply interruption or the like. In preparation for this kind of situation, auxiliary bearings are sometimes disposed separate from the magnetic bearings. Such auxiliary bearings are sometimes referred to as backup bearings. The bearing structure of Japanese Unexamined Patent Application Publication No. 2005-3009 has a touchdown bearing as this kind of auxiliary bearing.

SUMMARY

According to the investigations of the present inventors, there is room for improvement in the technology of Japanese Unexamined Patent Application Publication No. 2005-3009 from the viewpoint of ensuring the soundness of a fluid machine while preventing an increase in the length of the rotating shaft. One non-limiting and exemplary embodiment provides a bearing structure that is provided with magnetic bearings as thrust bearings, and that is suitable for ensuring the soundness of a fluid machine while preventing an increase in the length of a rotating shaft.

In one general aspect, the techniques disclosed here feature a bearing structure that includes: a rotating shaft; a thrust collar that is attached to the rotating shaft and rotates together with the rotating shaft; and a pair of thrust bearings that include a first thrust bearing and a second thrust bearing, in which the thrust collar is located between the first thrust bearing and the second thrust bearing in the axial direction of the rotating shaft, the first thrust bearing includes a first substrate, a first electromagnet attached to the first substrate, and a first member attached to the first substrate, the first member being disposed between the first substrate and the thrust collar in the axial direction, the second thrust bearing includes a second substrate, a second electromagnet attached to the second substrate, and a second member attached to the second substrate, the second member being disposed between the second substrate and the thrust collar in the axial direction, and a magnetic force generated by the first electromagnet and the second electromagnet, and dynamic gas pressure generated by the first member and the second member due to rotation of the rotating shaft support an axial load of the rotating shaft.

According to the technology as in the present disclosure, it is possible to provide a bearing structure that is provided with magnetic bearings as thrust bearings, and that is suitable for ensuring the soundness of a fluid machine while preventing an increase in the length of a rotating shaft.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2C depicts a bearing structure in embodiment 2.

Figure 1A:
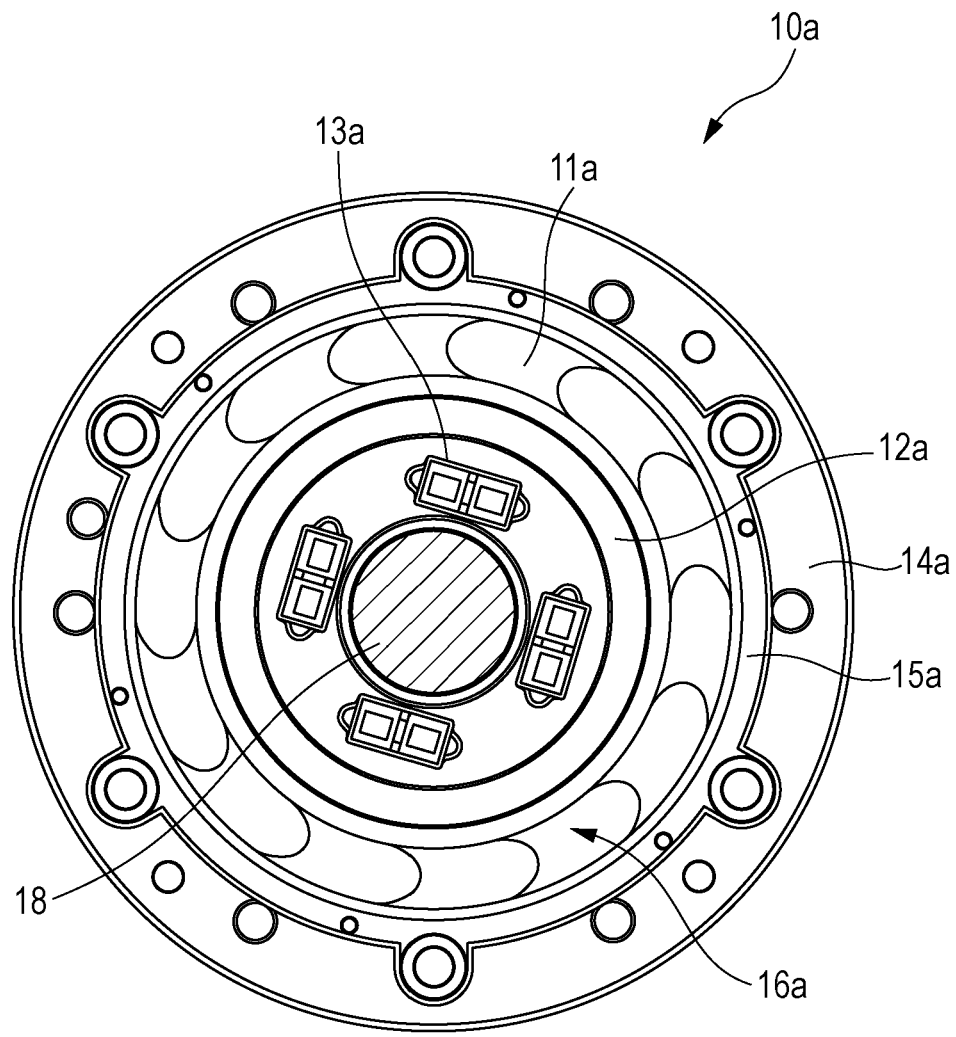
FIG. 1A depicts a first thrust bearing in embodiment 1.
Figure 1A:
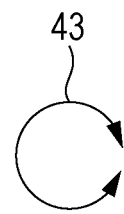

DETAILED DESCRIPTION (Findings of the Present Inventors)

In the bearing structure of Japanese Unexamined Patent Application Publication No. 2005-3009, the length of the rotating shaft 53c has increased due to the presence of the touchdown bearings. If the rotating shaft is long, the natural frequency of the rotation system that includes the rotating shaft decreases. If the natural frequency of the rotation system is low, it becomes difficult to increase the rotational speed of the rotation system while suppressing vibration of the rotation system. Due to reasons such as this, the presence of the touchdown bearings makes it difficult for the rotation system to be rotated at a high speed. This is disadvantageous from the viewpoint of ensuring the operating efficiency of the fluid machine.

However, let us suppose that the touchdown bearings were omitted. In this case, when the function of the magnetic bearings has been lost due to a power supply interruption or the like, the thrust collar 84 makes contact with the protective member 91 made of a synthetic resin, and friction is generated therebetween. In a fluid machine in which the rotation speed of the rotating shaft 53c exceeds 1000 rad/sec, due to this friction, the energy of the rotating shaft 53c is absorbed in a very short amount of time. The thrust collar 84 and the protective member 91 reach a high temperature due to frictional heat. With only the touchdown bearings being omitted, it is therefore difficult to ensure soundness as a fluid machine.

In consideration of the above, an objective of the present disclosure is to provide a bearing structure that is provided with magnetic bearings as thrust bearings, and that is suitable for ensuring the soundness of a fluid machine while preventing an increase in the length of a rotating shaft.

A first aspect of the present disclosure provides a bearing structure that includes:

a rotating shaft;

a thrust collar that is attached to the rotating shaft and rotates together with the rotating shaft; and a pair of thrust bearings that include a first thrust bearing and a second thrust bearing, in which the thrust collar is located between the first thrust bearing and the second thrust bearing in the axial direction of the rotating shaft, the first thrust bearing includes a first substrate, a first electromagnet attached to the first substrate, and a first member attached to the first substrate, the first member being disposed between the first substrate and the thrust collar in the axial direction, the second thrust bearing includes a second substrate, a second electromagnet attached to the second substrate, and a second member attached to the second substrate, the second member being disposed between the second substrate and the thrust collar in the axial direction, and a magnetic force generated by the first electromagnet and the second electromagnet, and dynamic gas pressure generated by the first member and the second member due to rotation of the rotating shaft support an axial load of the rotating shaft.

According to the first aspect, it is possible to provide a bearing structure that is provided with magnetic bearings as thrust bearings, and that is suitable for ensuring the soundness of a fluid machine while preventing an increase in the length of a rotating shaft.

A second aspect of the present disclosure provides a bearing structure in which, in addition to the first aspect, the first thrust bearing includes a first position detector that is attached to the first substrate and detects the position of the thrust collar, the second thrust bearing includes a second position detector that is attached to the second substrate and detects the position of the thrust collar, the first member is disposed in a position exposing the first position detector when viewed in the axial direction, and the second member is disposed in a position exposing the second position detector when viewed in the axial direction.

In the second aspect, the first member and the second member are disposed in positions exposing the first position detector and the second position detector, respectively. It is therefore possible to avoid a situation where the accuracy at which the position of the thrust collar is detected by the first position detector and the second position detector declines due to the first member and the second member. The second aspect is therefore advantageous from the viewpoint of ensuring accuracy in the detection of the position of the thrust collar.

There are cases where a component such as a compressor impeller or a turbine wheel is fastened to the rotating shaft, and the component rotates together with the rotating shaft. Being able to ensure accuracy in the detection of the position of the thrust collar means that the tip clearance of the component can be reduced. This is advantageous from the viewpoint of ensuring the performance such as the efficiency of the fluid machine in which the component has been applied to the rotating shaft. It should be noted that the tip clearance refers to a gap between the outer circumferential end of the component and a casing that surrounds the component from the outer side in the radial direction.

A third aspect of the present disclosure provides a bearing structure in which, in addition to the first aspect or the second aspect, the first member and the second member are flat bodies made of a nonmagnetic material, the first member is disposed in a position covering the first electromagnet when viewed in the axial direction, and the second member is disposed in a position covering the second electromagnet when viewed in the axial direction.

In the third aspect, the first member and the second member cover the first electromagnet and the second electromagnet, respectively. It is therefore easy to ensure the areas of the first member and the second member compared to a case where the first member and the second member do not cover the first electromagnet and the second electromagnet. Therefore, according to the third aspect, it is possible to increase the axial load of the rotating shaft that can be supported by the first member and the second member. Furthermore, in the third aspect, the first member and the second member are made of a nonmagnetic material. Therefore, even if the first member and the second member are covering the first electromagnet and the second electromagnet, there is unlikely to be any negative effect on the axial load support brought about by the first electromagnet and the second electromagnet.

A fourth aspect of the present disclosure provides a bearing structure in which, in addition to the third aspect, the first electromagnet, the second electromagnet, the first member, and the second member have a closed-frame shape when viewed in the axial direction, when the distance from the central axis of the rotating shaft to the outer circumferential end of the first electromagnet is defined as a distance $M1$, the distance from the central axis to the outer circumferential end of the first member is defined as a distance $P1$, and the ratio of the distance $P1$ to the distance $M1$ is defined as a ratio $R1$, the ratio $R1$ is 1.0 to 1.3 inclusive, and when the distance from the central axis to the outer circumferential end of the second electromagnet is defined as a distance $M2$, the distance from the central axis to the outer circumferential end of the second member is defined as a distance $P2$, and the ratio of the distance $P2$ to the distance $M2$ is defined as a ratio $R2$, the ratio $R2$ is 1.0 to 1.3 inclusive.

As mentioned above, in a case where the first member and the second member cover the first electromagnet and the second electromagnet, it is possible to increase the axial load of the rotating shaft that can be supported by the first member and the second member. In addition, in the fourth aspect, as is clear from the ratios $R1$ and $R2$, the amount of the first member that projects from the first electromagnet and the amount of the second member that projects from the second electromagnet are restricted. It is therefore possible to restrict the radial dimension of the thrust bearings. It is also possible to restrict the radial dimension of the thrust collar. If the radial dimension of the thrust collar is restricted, it becomes possible for the rotation system that includes the rotating shaft to be rotated at a high speed while suppressing whirling of the rotation system. As a result of it becoming possible for the rotation system to be rotated at a high speed, it becomes possible for the fluid machine to be operated in a highly efficient manner.

A fifth aspect of the present disclosure provides a bearing structure in which, in addition to the third aspect or the fourth aspect, the first thrust bearing includes a first position detector that is attached to the first substrate and detects the position of the thrust collar, the second thrust bearing includes a second position detector that is attached to the second substrate and detects the position of the thrust collar, the first position detector is disposed at the inner side of the first electromagnet in the radial direction of the rotating shaft, the second position detector is disposed at the inner side of the second electromagnet in the radial direction, the first member is disposed in a position exposing the first position detector when viewed in the axial direction, and the second member is disposed in a position exposing the second position detector when viewed in the axial direction.

The fifth aspect is therefore advantageous from the viewpoint of ensuring accuracy in the detection of the position of the thrust collar, similar to the second aspect.

Furthermore, if the technique of the third aspect and the technique of the fifth aspect are combined, it is possible to avoid the first member and the second member being disposed in portions near the rotating shaft, and to dispose the first member and the second member in portions that are far from the rotating shaft. The first member and the second member in portions that are far from the rotating shaft greatly contribute to generating dynamic pressure. In contrast, the dynamic pressure obtained by disposing the first member and the second member in portions that are near the rotating shaft is sometimes not as large, although this is also dependent on other conditions. This is because the circumferential speed of the thrust collar is comparatively low in portions that are near the rotating shaft. If the first member and the second member in portions that are near the rotating shaft are omitted, it is possible to reduce friction loss between a gas working fluid and the first member and second member while suppressing a decrease in the dynamic pressure obtained. A reduction in friction loss leads to ensuring efficiency of the fluid machine. For reasons such as this, there is value in adopting a combination of the technology of the third aspect and the technology of the fifth aspect.

Hereinafter, embodiments of the present disclosure will be described with reference to the drawings. It should be noted that the present disclosure is not limited to the embodiments given hereinafter.

Embodiment 1

Figure 1B:
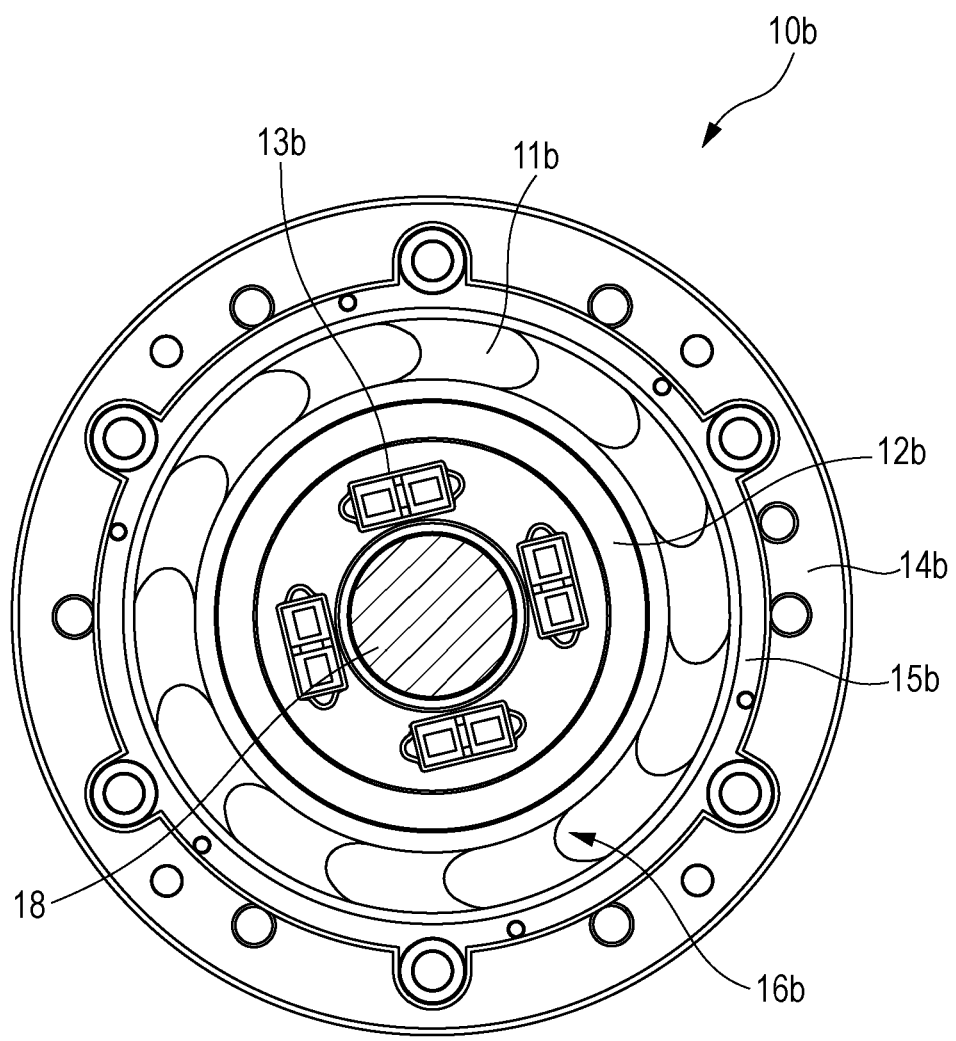
FIG. 1B depicts a second thrust bearing in embodiment 1.
Figure 1B:
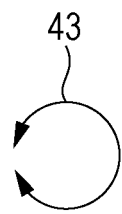
Figure 1C:
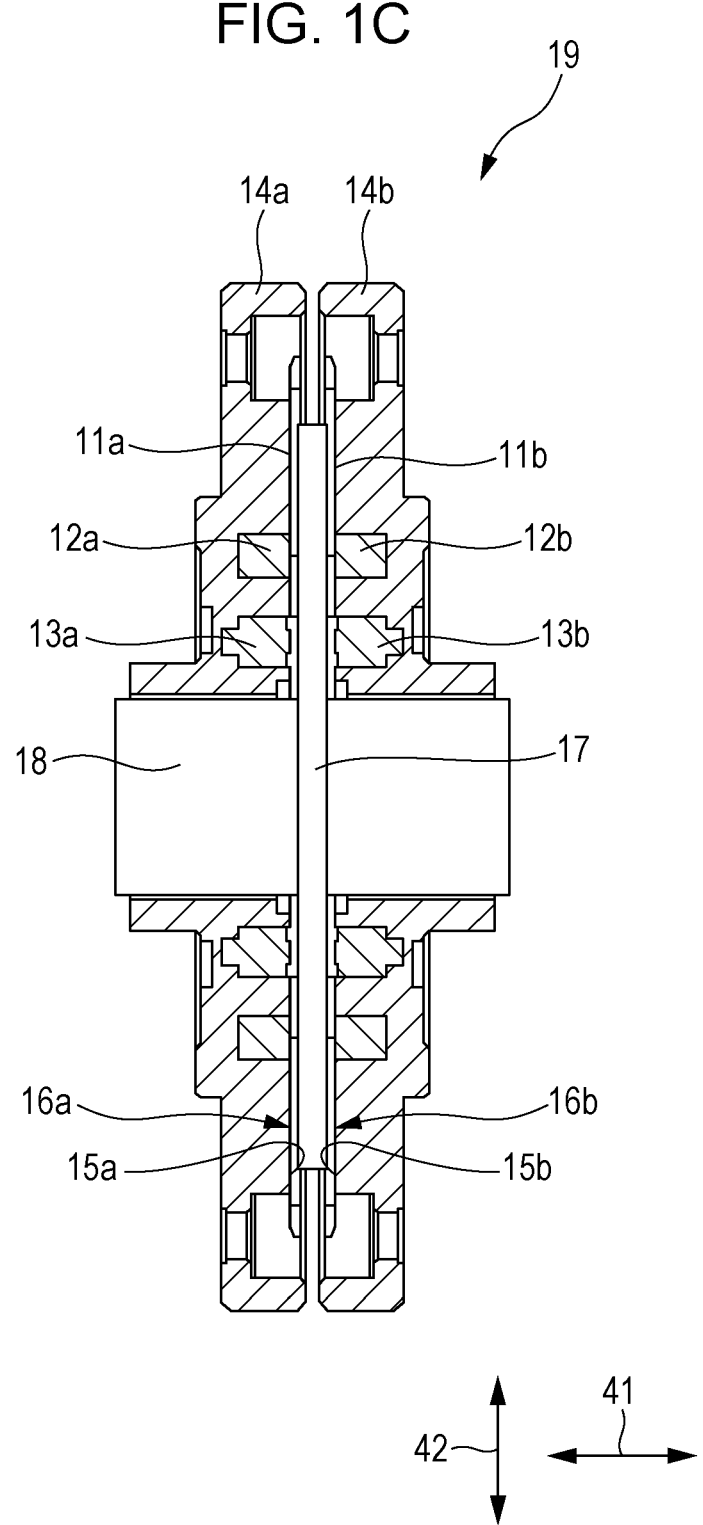
FIG. 1C depicts a bearing structure in embodiment 1.

FIG. 1A depicts a first thrust bearing 10a of embodiment 1, FIG. 1B depicts a second thrust bearing 10b of embodiment 1, and FIG. 1C depicts a bearing structure 19 of embodiment 1.

As is clear from FIGS. 1A to 1C, the bearing structure 19 is provided with a rotating shaft 18, a thrust collar 17, and the pair of thrust bearings 10a and 10b.

The bearing structure 19 can be adopted in a fluid machine that uses a gas as a working fluid. Although not particularly restricted, air, a fluorine-based coolant, or the like can be given as examples of a working fluid. Here, a fluorine-based coolant refers to a coolant that includes a component containing fluorine atoms.

A component such as a compressor impeller or a turbine wheel can be attached to the rotating shaft 18. It is therefore possible to realize a compressor and/or an expansion turbine in a fluid machine in which the bearing structure 19 has been adopted.

The thrust collar 17 is attached to the rotating shaft 18, and the thrust collar 17 rotates together with the rotating shaft 18.

In the present embodiment, the thrust collar 17 spreads in a radial direction 42 of the rotating shaft 18. The thrust collar 17 has a disk shape. Specifically, the thrust collar 17 has a circular shape when viewed in an axial direction 41. Furthermore, the thrust collar 17 is disposed coaxially with the rotating shaft 18.

The thrust collar 17 is made of a magnetic material. It should be noted that, in the present specification, a "magnetic material" refers to a material that has the property of acting as a magnetic body. The relative magnetic permeability of the magnetic material constituting the thrust collar 17 is 100 or more, for example. Specifically, carbon steel for machine structural use and cast steel are examples of the magnetic material constituting the thrust collar 17.

It should be noted that the aforementioned features relating to the thrust collar 17 can be applied also to a thrust collar 27 described hereinafter.

The pair of thrust bearings 10a and 10b are disposed on both sides of the rotating shaft 18 in the axial direction 41 when viewed from the thrust collar 17. The pair of thrust bearings 10a and 10b include the first thrust bearing 10a and the second thrust bearing 10b. The thrust collar 17 is located between the first thrust bearing 10a and the second thrust bearing 10b in the axial direction 41 of the rotating shaft 18.

The first thrust bearing 10a includes a first substrate 14a, a first electromagnet 12a, and a first member 11a. Furthermore, the first thrust bearing 10a includes at least one first position detector 13a. The second thrust bearing 10b includes a second substrate 14b, a second electromagnet 12b, and a second member 11b. Furthermore, the second thrust bearing 10b includes at least one second position detector 13b.

The first member 11a and the second member 11b are members that generate dynamic pressure. Therefore, hereinafter, the first member 11a is sometimes referred to as a first dynamic pressure generating member 11a and the second member 11b is sometimes referred to as a second dynamic pressure generating member 11b. The first member 11a can also be referred to as a first dynamic pressure generating mechanism 11a, and the second member 11b can also be referred to as a second dynamic pressure generating mechanism 11b.

In the present embodiment, the first substrate 14a includes a first recess 15a. A portion of the thrust collar 17 enters into the first recess 15a. Furthermore, there is a first gap 16a between the bottom of the first recess 15a and the thrust collar 17. The dimension of the first gap 16a in the axial direction 41 is 0.25 to 0.35 mm, for example.

In the present embodiment, the second substrate 14b includes a second recess 15b. A portion of the thrust collar 17 enters into the second recess 15b. Furthermore, there is a second gap 16b between the bottom of the second recess 15b and the thrust collar 17. The dimension of the second gap 16b in the axial direction 41 is 0.25 to 0.35 mm, for example.

The first electromagnet 12a is attached to the first substrate 14a. Specifically, the first electromagnet 12a is embedded in the first substrate 14a. More specifically, the first electromagnet 12a is embedded in the first substrate 14a in such a way that the first electromagnet 12a and the first substrate 14a are flush at the bottom of the first recess 15a.

The first gap 16a is present between the first electromagnet 12a and the thrust collar 17. As mentioned above, the dimension of the first gap 16a in the axial direction 41 is 0.25 to 0.35 mm, for example. If the first gap 16a is small to this degree, the first electromagnet 12a can suitably attract the thrust collar 17 and suitably support the thrust collar 17. Furthermore, if the first gap 16a is large to this degree, the defect of the first electromagnet 12a and the thrust collar 17 making contact is unlikely to occur.

In the present embodiment, the first electromagnet 12a has a closed-frame shape when viewed in the axial direction 41, from the viewpoint of FIG. 1A to be specific. Specifically, the first electromagnet 12a has an annular shape when viewed in the axial direction 41. Furthermore, the first electromagnet 12a is disposed coaxially with the rotating shaft 18.

The second electromagnet 12b is attached to the second substrate 14b. Specifically, the second electromagnet 12b is embedded in the second substrate 14b. More specifically, the second electromagnet 12b is embedded in the second substrate 14b in such a way that the second electromagnet 12b and the second substrate 14b are flush at the bottom of the second recess 15b.

Furthermore, the second gap 16b is present between the second electromagnet 12b and the thrust collar 17.

In the present embodiment, the second electromagnet 12b has a closed-frame shape when viewed in the axial direction 41, from the viewpoint of FIG. 1B to be specific. Specifically, the second electromagnet 12b has an annular shape when viewed in the axial direction 41. Furthermore, the second electromagnet 12b is disposed coaxially with the rotating shaft 18.

The first position detector 13a and the second position detector 13b detect the position of the thrust collar 17. In the present embodiment, the first position detector 13a and the second position detector 13b are electrostatic capacitive gap sensors.

The first position detector 13a is attached to the first substrate 14a. Specifically, the first position detector 13a is embedded in the first substrate 14a. More specifically, the first position detector 13a is embedded in the first substrate 14a in such a way that the first position detector 13a and the first substrate 14a are flush at the bottom of the first recess 15a.

The first gap 16a is present between the first position detector 13a and the thrust collar 17.

In the present embodiment, the first thrust bearing 10a has a plurality of first position detectors 13a, four to be specific. These first position detectors 13a are disposed side-by-side in an evenly spaced manner in a circumferential direction 43 encompassing the rotating shaft 18.

In the present embodiment, the first position detectors 13a are disposed at the inner side of the first electromagnet 12a in the radial direction 42.

The second position detector 13b is attached to the second substrate 14b. Specifically, the second position detector 13b is embedded in the second substrate 14b. More specifically, the second position detector 13b is embedded in the second substrate 14b in such a way that the second position detector 13b and the second substrate 14b are flush at the bottom of the second recess 15b.

The second gap 16b is present between the second position detector 13b and the thrust collar 17.

In the present embodiment, the second thrust bearing 10b has a plurality of second position detectors 13b, four to be specific. These second position detectors 13b are disposed side-by-side in an evenly spaced manner in the circumferential direction 43 encompassing the rotating shaft 18.

In the present embodiment, the second position detectors 13b are disposed at the inner side of the second electromagnet 12b in the radial direction 42.

The first dynamic pressure generating member 11a is attached to the first substrate 14a. The first dynamic pressure generating member 11a is disposed between the first substrate 14a and the thrust collar 17 in the axial direction 41. Specifically, the first dynamic pressure generating member 11a is housed in the first recess 15a.

In the present embodiment, the first dynamic pressure generating member 11a spreads in the radial direction 42. The first dynamic pressure generating member 11a is a flat body. It can also be said that the first dynamic pressure generating member 11a is a member having a thin plate shape. The thickness of the first dynamic pressure generating member 11a is less than the dimension of the first gap 16a in the axial direction 41. It is therefore possible for the first dynamic pressure generating member 11a to be installed. Due to the thinness of the first dynamic pressure generating member 11a, it is possible for the first dynamic pressure generating member 11a to be housed in the first recess 15a, and an increase in the length of the rotating shaft 18 in the axial direction 41 is prevented. However, it is not essential for the first dynamic pressure generating member 11a to be housed in the first recess 15a. An increase in the length of the rotating shaft 18 is prevented due to the thinness of the first dynamic pressure generating member 11a, even in a case where there the first recess 15a is not present. In this case also, it is possible to design the bearing structure in such a way that a gap having a dimension in the axial direction 41 of the order of 0.25 to 0.35 mm occurs between the first substrate 14a and the thrust collar 17, and the first dynamic pressure generating member 11a is disposed in this gap.

In the present embodiment, the first dynamic pressure generating member 11a has a closed-frame shape when viewed in the axial direction 41. Specifically, the first dynamic pressure generating member 11a has an annular shape when viewed in the axial direction 41. Furthermore, the first dynamic pressure generating member 11a is disposed coaxially with the rotating shaft 18.

In the present embodiment, the first dynamic pressure generating member 11a is a combination of a plurality of flat pieces. A flat piece can also be referred to as a thin plate piece. Specifically, adjacent flat pieces are disposed side-by-side in such a way as to partially overlap, and as a result the plurality of flat pieces surround the rotating shaft 18. According to this configuration, the first dynamic pressure generating member 11a can suitably generate dynamic gas pressure between the first substrate 14a and the thrust collar 17. Specifically, in the present embodiment, the thrust collar 17 rotates in a state in which a slight gap has been formed between the plurality of flat pieces and the thrust collar 17, and dynamic pressure is thereby generated therebetween.

The second dynamic pressure generating member 11b is attached to the second substrate 14b. The second dynamic pressure generating member 11b is disposed between the second substrate 14b and the thrust collar 17 in the axial direction 41. Specifically, the second dynamic pressure generating member 11b is housed in the second recess 15b.

In the present embodiment, the second dynamic pressure generating member 11b spreads in the radial direction 42. The second dynamic pressure generating member 11b is a flat body. It can also be said that the second dynamic pressure generating member 11b is a member having a thin plate shape. The thickness of the second dynamic pressure generating member 11b is less than the dimension of the second gap 16b in the axial direction 41. It is therefore possible for the second dynamic pressure generating member 11b to be installed. Due to the thinness of the second dynamic pressure generating member 11b, it is possible for the second dynamic pressure generating member 11b to be housed in the second recess 15b, and an increase in the length of the rotating shaft 18 in the axial direction 41 is prevented. However, it is not essential for the second dynamic pressure generating member 11b to be housed in the second recess 15b. An increase in the length of the rotating shaft 18 is prevented due to the thinness of the second dynamic pressure generating member 11b, even in a case where the second recess 15b is not present. In this case also, it is possible to design the bearing structure in such a way that a gap having a dimension in the axial direction 41 of the order of 0.25 to 0.35 mm occurs between the second substrate 14b and the thrust collar 17, and the second dynamic pressure generating member 11b is disposed in this gap.

In the present embodiment, the second dynamic pressure generating member 11b has a closed-frame shape when viewed in the axial direction 41. Specifically, the second dynamic pressure generating member 11b has an annular shape when viewed in the axial direction 41. Furthermore, the second dynamic pressure generating member 11b is disposed coaxially with the rotating shaft 18.

In the present embodiment, the second dynamic pressure generating member 11b is a combination of a plurality of flat pieces. A flat piece can also be referred to as a thin plate piece. Specifically, adjacent flat pieces are disposed side-by-side in such a way as to partially overlap, and as a result the plurality of flat pieces surround the rotating shaft 18. According to this configuration, the second dynamic pressure generating member 11b can suitably generate dynamic gas pressure between the second substrate 14b and the thrust collar 17. Specifically, in the present embodiment, the thrust collar 17 rotates in a state in which a slight gap has been formed between the plurality of flat pieces and the thrust collar 17, and dynamic pressure is thereby generated therebetween.

A nonmagnetic material can be used as the first dynamic pressure generating member 11a and the second dynamic pressure generating member 11b. In the present specification, a "nonmagnetic material" refers to a material that is not a ferromagnetic body. A "nonmagnetic material" refers to a material that substantially does not exhibit magnetism. The relative magnetic permeability of the nonmagnetic material constituting the dynamic pressure generating members 11a and 11b is 0.99 to 1.01, for example. Specifically, those that are classified as nonmagnetic materials from among stainless steels are examples of the material for the dynamic pressure generating members 11a and 11b.

The thickness of each flat piece making up the first dynamic pressure generating member 11a and the second dynamic pressure generating member 11b is 0.1 to 0.15 mm, for example.

The first dynamic pressure generating member 11a and the second dynamic pressure generating member 11b provide the merit of auxiliary machinery not being required, which is different from the case where static pressure is generated.

It should be noted that the aforementioned features relating to the first dynamic pressure generating member 11a and the second dynamic pressure generating member 11b can be applied to first dynamic pressure generating members 21a and 31a and to second dynamic pressure generating members 21b and 31b described hereinafter provided there are no resulting inconsistencies.

In the bearing structure 19, the first electromagnet 12a and the second electromagnet 12b generate a magnetic force. Furthermore, dynamic pressure is generated in the first dynamic pressure generating member 11a and the second dynamic pressure generating member 11b due to the rotation of the rotating shaft 18. The magnetic forces and the dynamic pressure support the axial load of the rotating shaft 18. In the bearing structure 19, in this way, the function of a magnetic bearing and the function of a dynamic gas pressure bearing are exhibited.

The function of a magnetic bearing and the function of a dynamic gas pressure bearing are exhibited independently. It is therefore possible to support the axial load of the rotating shaft 18 by means of the function of the dynamic gas pressure bearing even if the function of the magnetic bearing of the bearing structure 19 has been lost due to a power supply interruption or the like. It is therefore easy to avoid contact between the thrust bearings 10a and 10b and the thrust collar 17. Therefore, a failure caused by this contact is unlikely to occur in a fluid machine in which the bearing structure 19 has been applied.

Furthermore, combined use of the electromagnets 12a and 12b and the dynamic pressure generating members 11a and 11b is unlikely to cause an increase in the length of the rotating shaft 18.

For the aforementioned reason, according to the present embodiment, it is possible to provide a bearing structure that is provided with magnetic bearings as thrust bearings, and that is suitable for ensuring the soundness of a fluid machine while preventing an increase in the length of a rotating shaft.

In a case where the length of the rotating shaft 18 is prevented from increasing, the natural frequency of the rotation system including the rotating shaft 18 is unlikely to decrease. Thus, high speed rotation of the rotation system becomes possible, and highly efficient operation of the fluid machine in which the bearing structure 19 has been applied becomes possible.

In the present embodiment, the first dynamic pressure generating member 11a is disposed in a position exposing the first position detectors 13a when viewed in the axial direction 41, specifically, a position exposing the first position detectors 13a in the first gap 16a. The second dynamic pressure generating member 11b is disposed in a position exposing the second position detectors 13b when viewed in the axial direction 41, specifically, a position exposing the second position detectors 13b in the second gap 16b. It is therefore possible to avoid a situation where the accuracy at which the position of the thrust collar 17 is detected by the position detectors 13a and 13b declines due to the dynamic pressure generating members 11a and 11b. Therefore, the present embodiment is advantageous from the viewpoint of ensuring accuracy in the detection of the position of the thrust collar 17.

Typically, a component such as a compressor impeller or a turbine wheel is fastened to the rotating shaft 18, and the component rotates together with the rotating shaft 18. Being able to ensure accuracy in the detection of the position of the thrust collar 17 at such time means that the tip clearance of the component can be reduced. This is advantageous from the viewpoint of ensuring the performance such as the efficiency of the fluid machine in which the component has been applied to the rotating shaft 18.

It should be noted that, in the present embodiment, the first dynamic pressure generating member 11a is disposed in a position exposing the first electromagnet 12a, specifically, a position exposing the first electromagnet 12a in the first gap 16a. Furthermore, the second dynamic pressure generating member 11b is disposed in a position exposing the second electromagnet 12b, specifically, a position exposing the second electromagnet 12b in the second gap 16b. However, this configuration is not essential, as is clear from the embodiments described hereinafter.

Furthermore, in the present embodiment, the first position detectors 13a are disposed at the inner side of the first electromagnet 12a in the radial direction 42. The second position detectors 13b are disposed at the inner side of the second electromagnet 12b in the radial direction 42. The circumferential speed of the thrust collar 17 is comparatively low at the comparatively inner side in the radial direction 42. The position detectors 13a and 13b are disposed at the comparatively inner side in the radial direction 42, and it is therefore easy to ensure position detection accuracy with respect to the thrust collar 17. Meanwhile, the electromagnets 12a and 12b are disposed at the comparatively outer side in the radial direction 42, and it is therefore easy to ensure the areas of the electromagnets 12a and 12b. The axial load of the rotating shaft 18 can therefore be suitably supported by the electromagnets 12a and 12b.

Embodiment 2

Hereinafter, embodiment 2 will be described. It should be noted that, in embodiment 2, portions that are the same as in embodiment 1 are denoted by the same reference numbers, and descriptions thereof may be omitted.

Figure 2A:
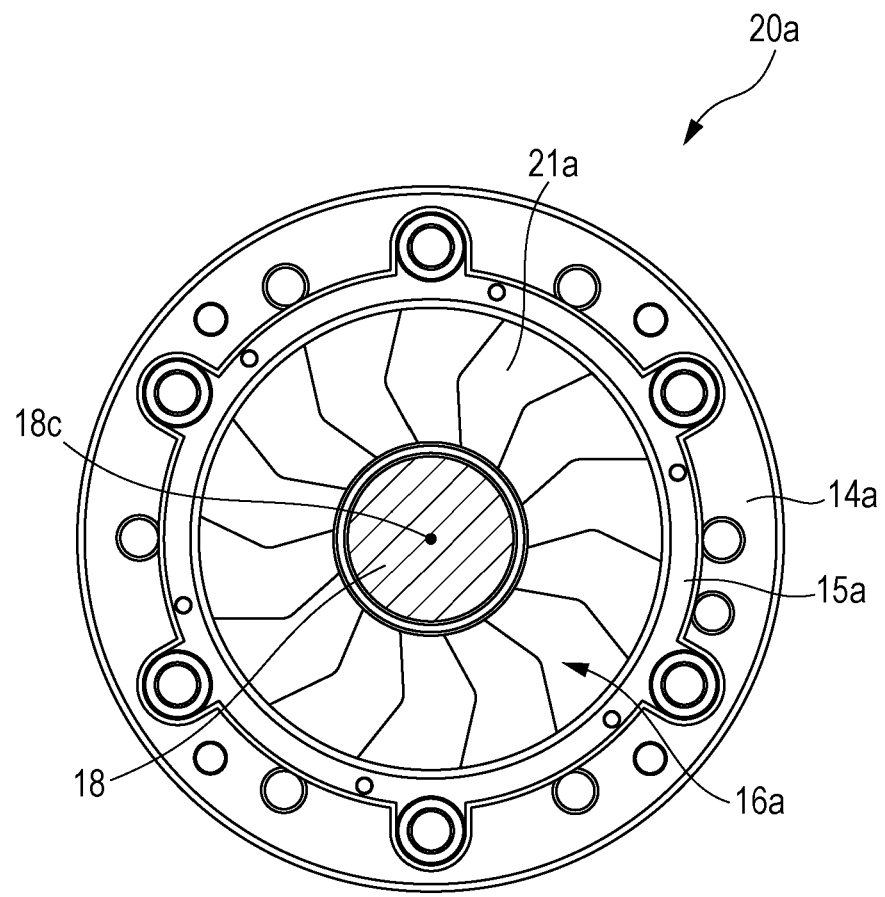
FIG. 2A depicts a first thrust bearing in embodiment 2.
Figure 2A:
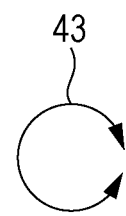
Figure 2B:
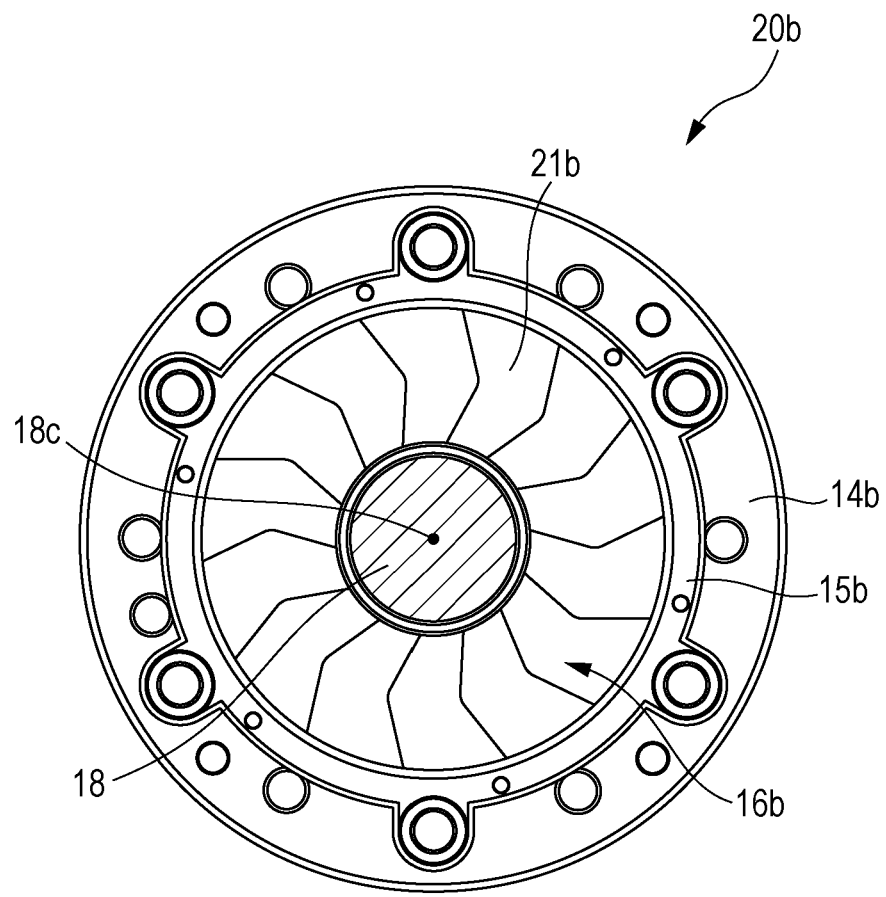
FIG. 2B depicts a second thrust bearing in embodiment 2.
Figure 2B:
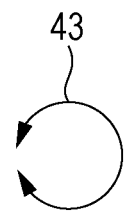

FIG. 2A depicts a first thrust bearing 20a of embodiment 2, FIG. 2B depicts a second thrust bearing 20b of embodiment 2, and FIG. 2C depicts a bearing structure 29 of embodiment 2.

As is clear from FIGS. 2A to 2C, the bearing structure 29 is provided with the rotating shaft 18 and the pair of thrust bearings 20a and 20b. The bearing structure 29 is provided with the thrust collar 27 instead of the thrust collar 17 of embodiment 1.

In the present embodiment, the dimension of the thrust collar 27 in the radial direction 42 is smaller than the dimension of the thrust collar 17 in the radial direction 42. However, in the present embodiment, it is also possible for the thrust collar 17 to be used instead of the thrust collar 27. The same is also true in embodiment 3 described hereinafter.

The pair of thrust bearings 20a and 20b are disposed on both sides of the rotating shaft 18 in the axial direction 41 when viewed from the thrust collar 27. The pair of thrust bearings 20a and 20b include the first thrust bearing 20a and the second thrust bearing 20b. The thrust collar 27 is located between the first thrust bearing 20a and the second thrust bearing 20b in the axial direction 41 of the rotating shaft 18.

The first thrust bearing 20a has a first dynamic pressure generating member 21a instead of the first dynamic pressure generating member 11a of embodiment 1. Furthermore, the second thrust bearing 20b has a second dynamic pressure generating member 21b instead of the second dynamic pressure generating member 11b of embodiment 1.

In the present embodiment, similar to embodiment 1, the first electromagnet 12a, the second electromagnet 12b, the first dynamic pressure generating member 21a, and the second dynamic pressure generating member 21b have a closed-frame shape when viewed in the axial direction 41. A flat body made of a nonmagnetic material can be used for the first dynamic pressure generating member 21a and the second dynamic pressure generating member 21b.

In the present embodiment, the first dynamic pressure generating member 21a is disposed in a position covering the first electromagnet 12a when viewed in the axial direction 41. The second dynamic pressure generating member 21b is disposed in a position covering the second electromagnet 12b when viewed in the axial direction 41.

As mentioned above, in the present embodiment, the dynamic pressure generating members 21a and 21b cover the electromagnets 12a and 12b. It is therefore easy to ensure the areas of the dynamic pressure generating members 21a and 21b compared to a case where the dynamic pressure generating members 21a and 21b do not cover the electromagnets 12a and 12b. Therefore, according to the present embodiment, it is possible to increase the axial load of the rotating shaft 18 that can be supported by the dynamic pressure generating members 21a and 21b. Furthermore, in the present embodiment, the dynamic pressure generating members 21a and 21b are made of a nonmagnetic material. Therefore, even if the dynamic pressure generating members 21a and 21b are covering the electromagnets 12a and 12b, there is unlikely to be any negative effect on the axial load support brought about by the electromagnets 12a and 12b.

In the present embodiment, the first dynamic pressure generating member 21a is disposed in a position covering the first position detectors 13a when viewed in the axial direction 41. The second dynamic pressure generating member 21b is disposed in a position covering the second position detectors 13b when viewed in the axial direction 41. This configuration also contributes to ensuring the areas of the dynamic pressure generating members 21a and 21b and the axial load support brought about by the dynamic pressure generating members 21a and 21b.

In the present embodiment, when the distance from a central axis 18c of the rotating shaft 18 to the outer circumferential end of the first electromagnet 12a is defined as a distance M1, the distance from the central axis 18c to the outer circumferential end of the first dynamic pressure generating member 21a is defined as a distance P1, and the ratio of the distance P1 to the distance M1 is defined as a ratio R1, the ratio R1=P1/M1 is 1.0 to 1.3 inclusive. When the distance from the central axis 18c to the outer circumferential end of the second electromagnet 12b is defined as a distance M2, the distance from the central axis 18c to the outer circumferential end of the second dynamic pressure generating member 21b is defined as a distance P2, and the ratio of the distance P2 to the distance M2 is defined as a ratio R2, the ratio R2=P2/M2 is 1.0 to 1.3 inclusive. Here, the "outer circumferential end" refers to the outer circumferential end in the radial direction 42.

As mentioned above, in a case where the dynamic pressure generating members 21a and 21b cover the electromagnets 12a and 12b, it is possible to increase the axial load of the rotating shaft 18 that can be supported by the dynamic pressure generating members 21a and 21b. In addition, in the present embodiment, as is clear from the ratios R1 and R2, the amounts of the dynamic pressure generating members 21a and 21b that project from the electromagnets 12a and 12b are restricted. It is therefore possible to restrict the radial dimension of the thrust bearings 20a and 20b. It is also possible to restrict the radial dimension of the thrust collar 27. If the radial dimension of the thrust collar 27 is restricted, it becomes possible for the rotation system that includes the rotating shaft 18 to be rotated at a high speed while suppressing whirling of the rotation system. As a result of it becoming possible for the rotation system to be rotated at a high speed, it becomes possible for the fluid machine to be operated in a highly efficient manner.

It should be noted that the ratios R1 and R2 can also be 1.00 to 1.15 inclusive. The ratios R1 and R2 of the present embodiment can also be applied to embodiment 3.

In the example of FIG. 2C, the diameters of the dynamic pressure generating members 21a and 21b are smaller than the diameter of the thrust collar 27. However, the diameters of the dynamic pressure generating members 21a and 21b may be the same as the diameter of the thrust collar 27. Furthermore, the diameters of the dynamic pressure generating members 21a and 21b may be larger than the diameter of the thrust collar 27.

Embodiment 3

Hereinafter, embodiment 3 will be described. It should be noted that, in embodiment 3, portions that are the same as in embodiment 2 are denoted by the same reference numbers, and descriptions thereof may be omitted.

Figure 3A:
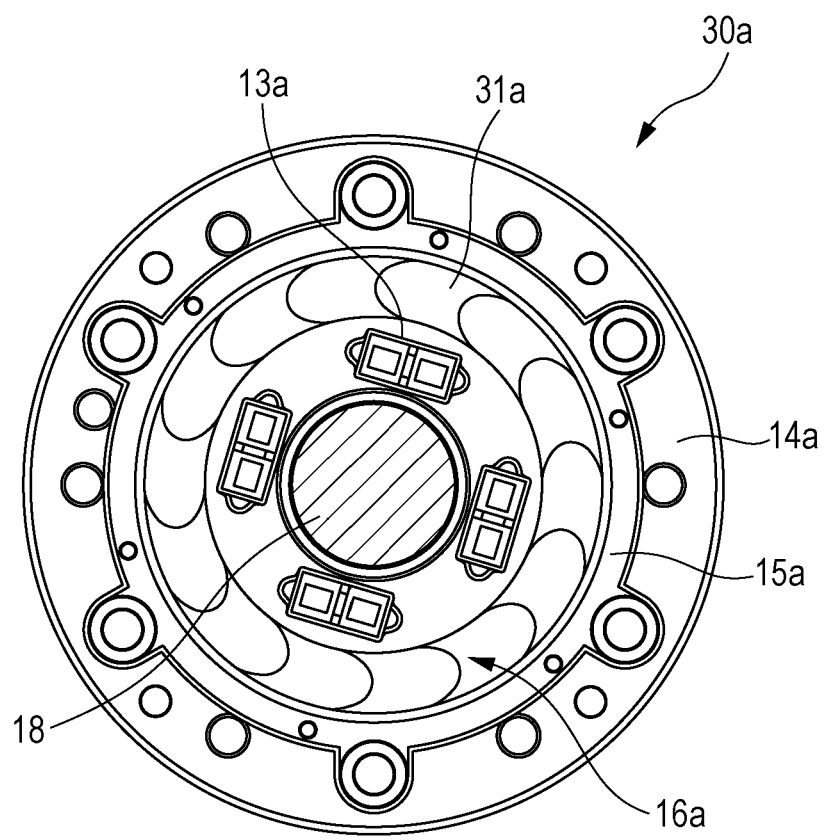
FIG. 3A depicts a first thrust bearing in embodiment 3.
Figure 3A:
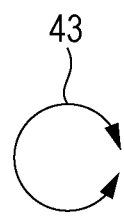
Figure 3B:
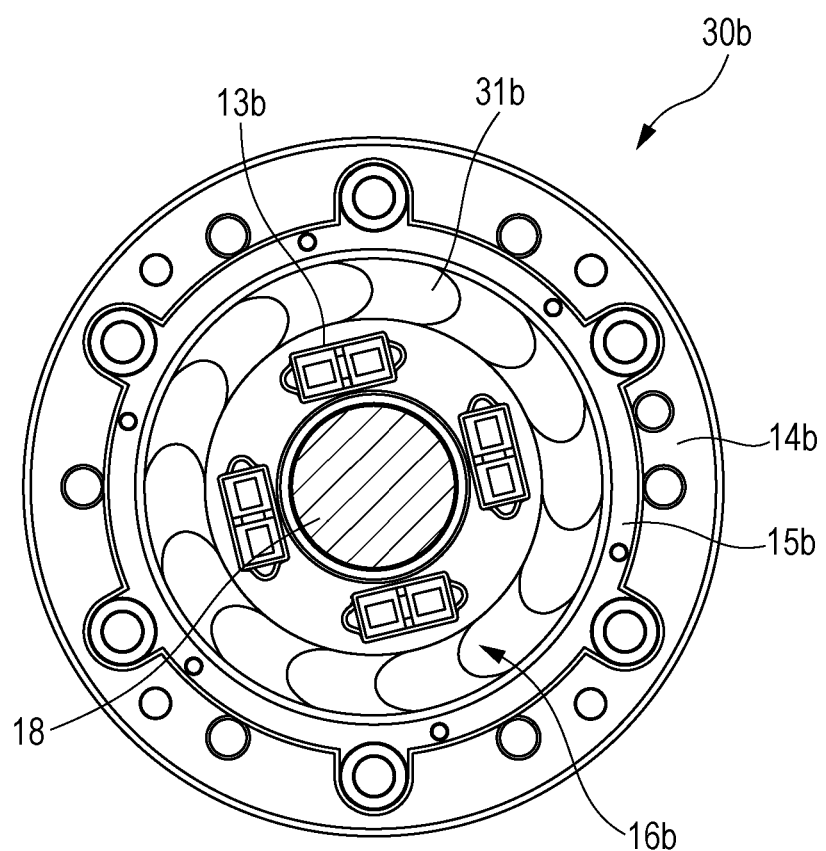
FIG. 3B depicts a second thrust bearing in embodiment 3.
Figure 3B:
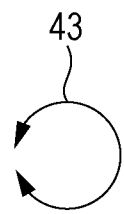
Figure 3C:
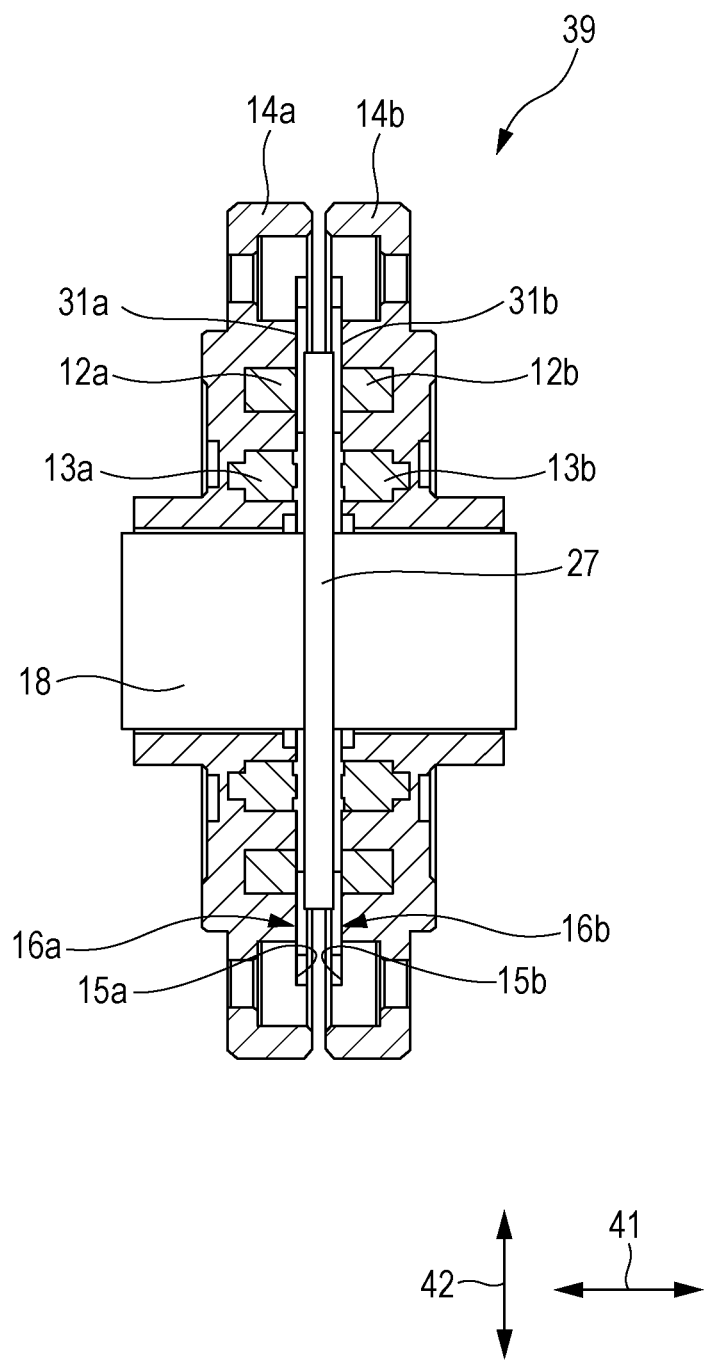
FIG. 3C depicts a bearing structure in embodiment 3.
Figure 4:
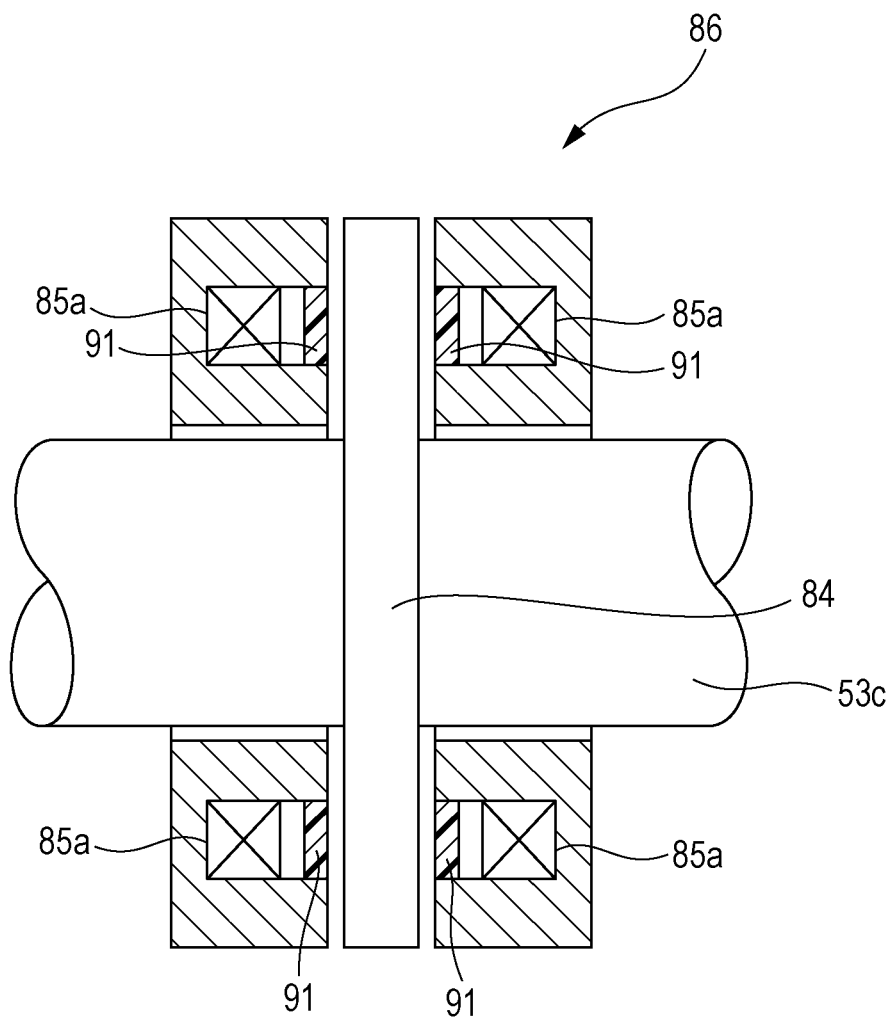
FIG. 4 depicts a bearing structure in Japanese Unexamined Patent Application Publication No. 2005-3009.

FIG. 3A depicts a first thrust bearing 30a of embodiment 3, FIG. 3B depicts a second thrust bearing 30b of embodiment 3, and FIG. 3C depicts a bearing structure 39 of embodiment 3.

As is clear from FIGS. 3A to 3C, the bearing structure 39 is provided with the rotating shaft 18, the thrust collar 27, and the pair of thrust bearings 30a and 30b. The pair of thrust bearings 30a and 30b include the first thrust bearing 30a and the second thrust bearing 30b.

The first thrust bearing 30a includes a first dynamic pressure generating member 31a instead of the first dynamic pressure generating member 21a of embodiment 2. Furthermore, the second thrust bearing 30b includes a second dynamic pressure generating member 31b instead of the second dynamic pressure generating member 21b of embodiment 2.

In the present embodiment, similar to embodiment 2, the first thrust bearing 30a includes the first position detectors 13a that are attached to the first substrate 14a and detect the position of the thrust collar 27. The second thrust bearing 30b includes the second position detectors 13b that are attached to the second substrate 14b and detect the position of the thrust collar 27.

In the present embodiment, similar to embodiment 1, the first dynamic pressure generating member 31a is disposed in a position exposing the first position detectors 13a when viewed in the axial direction 41, specifically, a position exposing the first position detectors 13a in the first gap 16a. The second dynamic pressure generating member 31b is disposed in a position exposing the second position detectors 13b when viewed in the axial direction 41, specifically, a position exposing the second position detectors 13b in the second gap 16b. The present embodiment is therefore advantageous from the viewpoint of ensuring accuracy in the detection of the position of the thrust collar.

In the present embodiment, the first position detectors 13a are disposed at the inner side of the first electromagnet 12a in the radial direction 42. The second position detectors 13b are disposed at the inner side of the second electromagnet 12b in the radial direction 42. Specifically, the dynamic pressure generating members 31a and 31b are disposed in such a way that the positional relationship between the position detectors 13a and 13b and the electromagnets 12a and 12b is set in the aforementioned manner, and in such a way as to expose the position detectors 13a and 13b and cover the electromagnets 12a and 12b. It thereby becomes possible to avoid the dynamic pressure generating members 31a and 31b being disposed in portions that are near the rotating shaft 18, and to dispose the dynamic pressure generating members 31a and 31b in portions that are far from the rotating shaft 18. The dynamic pressure generating members 31a and 31b in portions that are far from the rotating shaft 18 greatly contribute to generating dynamic pressure. In contrast, the dynamic pressure obtained by disposing the dynamic pressure generating members 31a and 31b in portions that are near the rotating shaft 18 is sometimes not as large, although this is also dependent upon other conditions. This is because the circumferential speed of the thrust collar 27 is comparatively low in portions that are near the rotating shaft 18. If the dynamic pressure generating members 31a and 31b in portions that are near the rotating shaft 18 are omitted, it is possible to reduce friction loss between the gas working fluid and the dynamic pressure generating members 31a and 31b while suppressing a decrease in the obtained dynamic pressure. A reduction in friction loss leads to ensuring efficiency of the fluid machine.

The bearing structures described in the aforementioned embodiments can be applied in a compressor, an expansion turbine generator, a gas turbine generator, a blower, or the like.

What is claimed is:

1. A structure comprising: a rotating shaft;
   a thrust collar that is attached to the rotating shaft and rotates together with the rotating shaft; and
   a pair of thrust bearings that include a first thrust bearing and a second thrust bearing, wherein:
   the thrust collar is located between the first thrust bearing and the second thrust bearing in an axial direction of the rotating shaft, the first thrust bearing includes a first substrate, a first electromagnet attached to the first substrate, a first member attached to the first substrate, and a first position detector that is attached to the first substrate and detects a position of the thrust collar,
   the first member being disposed between the first substrate and the thrust collar in the axial direction,
   the second thrust bearing includes a second substrate, a second electromagnet attached to the second substrate, a second member attached to the second substrate, and a second position detector that is attached to the second substrate and detects the position of the thrust collar,
   the second member being disposed between the second substrate and the thrust collar in the axial direction,
   the first electromagnet and the second electromagnet generate a magnetic force for supporting an axial load of the rotating shaft, and the first member and the second member generate dynamic gas pressure due to rotation of the rotating shaft for supporting the axial load, and
   the first position detector and the second position detector are disclosed so as to directly face the trust collar, respectively, in the axial direction.

2. The structure according to claim 1, wherein:
   the first member does not overlap with the first position detector when viewed in the axial direction, and
   the second member does not overlap with the second position detector when viewed in the axial direction.

3. The structure according to claim 1,
wherein each of the first member and the second member is a nonmagnetic material plate.

4. The structure according to claim 1, wherein:
the first electromagnet, the second electromagnet, the first member, and the second member have a closed-frame shape when viewed in the axial direction,
when a distance from a central axis of the rotating shaft to an outer circumferential end of the first electromagnet is defined as a distance M1, and a distance from the central axis to an outer circumferential end of the first member is defined as a distance P1, the distance P1 is larger than the distance M1, and
when a distance from the central axis to an outer circumferential end of the second electromagnet is defined as a distance M2, a distance from the central axis to an outer circumferential end of the second member is defined as a distance P2, the distance P2 is larger than the distance M2.

5. The structure according to claim 1, wherein:
the first position detector is disposed at an inner side of the first electromagnet in the radial direction,
the second position detector is disposed at an inner side of the second electromagnet in the radial direction,
the first member is disposed in a position exposing the first position detector when viewed in the axial direction, and
the second member is disposed in a position exposing the second position detector when viewed in the axial direction.

6. The structure according to claim 4, wherein:
when a ratio of the distance P1 to the distance M1 is defined as a ratio R1, the ratio R1 is 1.0 to 1.3 inclusive, and
when a ratio of the distance P2 to the distance M2 is defined as a ratio R2, the ratio R2 is 1.0 to 1.3 inclusive.

7. The structure according to claim 1, wherein
when viewed in the axial direction,
the first member overlaps with the first electromagnet, and
the first member overlaps with the first electromagnet.

8. The structure according to claim 1, wherein:
when a gap in the axial direction between the first position detector and the thrust collar is defined as a first gap, a thickness of the first, member in the axial direction is less than a dimension of the first gap in the axial direction, and
when a gap in the axial direction between the second position detector and the thrust collar is defined as a second gap, a thickness of the second member in the axial direction is less than a dimension of the second gap in the axial direction.

9. The structure according to claim 1, wherein
the first member is disposed in a recess formed in the first substrate, and the second member is disposed in a recess formed in the second substrate.

10. The structure according to claim 1, wherein
when viewed in the axial direction,
the first position detector is disposed at an inner side of the first member in a radial direction of the rotating shaft, and
the second position detector is disposed at an inner side of the second member in the radial direction.

* * * * *